United States Patent
Namm et al.

(10) Patent No.: US 8,380,228 B2
(45) Date of Patent: Feb. 19, 2013

(54) METHOD FOR MANAGING POWER CONSUMPTION OF A PAGER ON A TRUNKED NETWORK

(75) Inventors: Joseph C. Namm, Plantation, FL (US); David R. Mills, West Palm Beach, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 424 days.

(21) Appl. No.: 12/647,942

(22) Filed: Dec. 28, 2009

(65) Prior Publication Data

US 2011/0159894 A1    Jun. 30, 2011

(51) Int. Cl.
*H04W 68/00* (2009.01)

(52) U.S. Cl. ........ 455/458; 455/520; 455/519; 455/518; 455/13.4; 455/502; 455/509; 455/522; 455/63.3; 455/574

(58) Field of Classification Search .................. 455/520, 455/521, 519, 518, 458, 13.4, 502, 509, 522, 455/63.3, 574
See application file for complete search history.

(56) References Cited

U.S. PATENT DOCUMENTS

| | | | |
|---|---|---|---|
| 5,483,672 A * | 1/1996 | Sasuta | 455/509 |
| 6,553,228 B1 * | 4/2003 | Kotzin | 455/434 |
| 7,177,654 B2 | 2/2007 | Stenberg | |
| 2003/0107475 A1 | 6/2003 | Bautista et al. | |
| 2008/0003942 A1 | 1/2008 | Namm | |

* cited by examiner

*Primary Examiner* — Kwasi Karikari
(74) *Attorney, Agent, or Firm* — Valerie M. Davis; Kenneth A. Haas

(57) ABSTRACT

Systems and methods for managing power consumption on a trunked network include listening to a control channel on a trunked system with a trunked pager, and receiving a voice channel assignment. The trunked pager listens for voice traffic on the assigned voice channel while in a standby mode. Voice traffic is detected and the trunked pager determines whether the voice traffic is for a communication group that includes the trunked pager. If so, the trunked pager unmutes and listens to the voice traffic. Upon termination of the voice traffic, the trunked pager returns to the control channel to listen for a different voice channel assignment. Otherwise, the trunked pager directly returns to the control channel to listen for a different voice channel assignment.

12 Claims, 4 Drawing Sheets

METHOD FOR MANAGING POWER CONSUMPTION OF A PAGER ON A TRUNKED NETWORK

TECHNICAL FIELD

The present disclosure relates generally to communication systems and in particular to a system and method of managing power consumption of a pager on a trunked network.

BACKGROUND

Efficient, reliable, and real-time communication with minimal latency is a critical requirement for public safety organizations and first responders. Toward that end, the Telecommunications Industry Association (TIA) adopted and standardized a suite of Land Mobile Radio (LMR) standards termed Project 25 (P25), as described for example, in the TIA 102-series documents. The emerging P25 standard defines the operation and interfaces of P25-compliant radio systems. Specifically, and in part, the P25 standard defines a standard for trunked systems.

A "trunked system" or "trunked network" refers to a radio system where a limited number of frequencies are shared among a large group of users. Trunked systems are particularly beneficial in specific instances where there is a limited number of available communication frequencies. The large group of users in a trunked system are each assigned to a virtual channel or "talkgroup" having a group identification (group ID). Moreover, in a trunked system, the number of talkgroups is not limited to the number of available communication frequencies, and can actually greatly exceed the number of frequencies.

Many fire departments and other public safety organizations currently use legacy analog, receive only pagers to relay voice traffic to their users. To support such pagers on a trunked system, the voice traffic is adapted to the capabilities of the pager (e.g., via a voice-to-text translation) and simulcast on a designated analog conventional channel for each talkgroup that needs to be relayed. However, this translates to additional, costly infrastructure and frequencies that require customer maintenance for each supported talkgroup. Nevertheless, as an increasing number of counties and states are adopting P25-based systems, including P25-based trunked systems, many users of legacy pagers are being compelled to adopt a trunked solution.

Thus, various challenges related to trunked systems need to be addressed. In particular, subscribers on a P25 trunked system continuously receive control channel data in accommodating the P25 standard. Inherent operation with continuous reception diminishes battery life of trunked pagers within a relatively short time-period, thus making their use on a trunked system impractical.

Accordingly, there is a need for a system and method of managing power consumption on a trunked network.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

Figure 1:
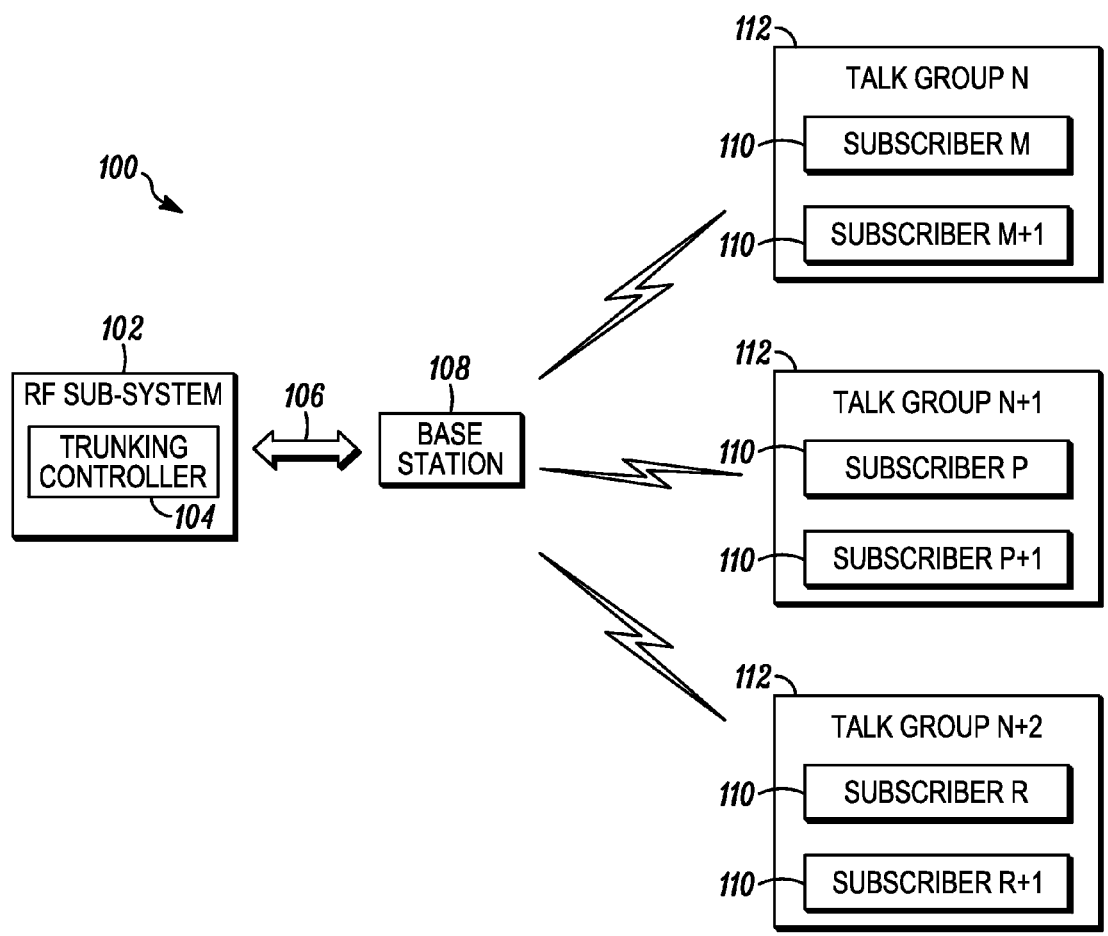
FIG. 1 illustrates a trunked network in accordance with some embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a system and method of managing power consumption for pagers on a trunked network. At times, as described herein, the terms "trunked network" and "trunked system" are used interchangeably. Illustrative embodiments of the present disclosure, as described below, are applicable to receive only pagers. Other embodiments are applicable to P25 trunked pagers, as discussed below. Further, certain advantages of the methods as described herein, are beneficial to any type of trunked subscriber on the trunked network.

Accordingly, methods for managing power consumption in a trunked pager include listening to a control channel on a trunked system with a trunked pager. The trunked pager receives a voice channel assignment for paging listeners. While in a standby mode, the trunked pager listens for voice traffic on the assigned voice channel. The standby mode is a low power mode of operation designed to extend a battery life of the trunked pager. For purposes of this disclosure, as described herein, the terms "listening subscribers" and "listening trunked pagers" are referred to as "paging listeners". Also, at times as described herein, the term "subscriber" is used interchangeably with the terms "pager" and "trunked pager", and the term "subscribers" is used interchangeably with the terms "pagers" and "trunked pagers", wherein a "pager" is a simple telecommunications device that can be used for sending and/or receiving short messages including numeric and/or alphanumerical messages.

The trunked pager detects the voice traffic and determines whether the voice traffic is for a communication group that includes the trunked pager. In various embodiments, as described herein, the communication group is referred to as a "talkgroup" or "group". The subscribers can be members of the group or talk group that include a combination of preconfigured users or ad hoc users or members. Alternatively, subscribers may not be members of such groups. Further, each subscriber engages in a communication session by way of any combination of hardware and software and/or firmware as discussed below. When the voice traffic is for a communication group that includes the trunked pager, the trunked pager unmutes and listens to (processes for a user) the voice traffic. Upon termination of the voice traffic, the once listening trunked pager returns to the control channel to listen for a different voice channel assignment for the paging listeners. When the voice traffic is for a communication group that does not include the trunked pager, the trunked pager directly returns to the control channel to listen for a different voice channel assignment for the paging listeners.

In various embodiments, methods for managing power consumption are applicable to the trunked network, where the trunked network includes a trunking controller. Illustratively, at the trunking controller, methods for conserving power on the trunked network include providing a voice channel assignment to paging listeners on a control channel.

The trunking controller transmits the voice traffic on the assigned voice channel while the paging listeners are in the standby mode. As described below, the trunking controller identifies a communication group from the paging listeners to unmute to the voice traffic by way of link control data. The trunking controller provides a different voice channel assignment to the paging listeners in addition to transmitting the voice traffic on the different voice channel while the paging listeners are in the standby mode.

As described in this disclosure, the systems and methods of managing power consumption on a trunked network are compliant with established standards and protocols for radio communications, for example, as is described in the TIA 102 series documents. Specifically, the TIA 102 documents include a description of radio communication over a Common Air Interface (CAI) as described, for example, in TIA-102.BAAA published January 1996 by the TIA and any subsequent revisions. The CAI defines a standard for radio-to-radio communication. In particular, using the CAI, any P25-compatible radio can communicate with any other P25-compatible radio. P25 uses a vocoder to convert speech into a digital format for transmission over a radio channel using a standard CAI packet structure for traffic and signaling.

In various embodiments as described herein, a trunked network includes a radio frequency sub-system (RFSS) having a trunking controller used for enabling aspects of the current disclosure. Additionally, the RFSS is in communication with a "fixed station" such as a base station.

In some embodiments, the base station communicates directly to a trunked pager to relay voice traffic and control channel data from the trunking controller within the RFSS. Alternatively, the base station can communicate with the trunked pager through a repeater. The repeater is used to extend network coverage by providing wireless CAI communication between base stations as well as between a base station and the trunked pager.

Illustratively, the base station is connected to the RFSS by either an analog fixed station interface (AFSI) or a digital fixed station interface (DFSI). Embodiments of the present disclosure that incorporate various aspects of the trunked network advantageously utilize standard IP protocols. Such IP protocols include user datagram protocol (UDP)/internet protocol (IP) connections as described in IETF RFC 768 dated August 1980 and any subsequent revisions, and as described in IETF RFC 791 dated September 1981 and any subsequent revisions, as well as real-time transport protocol (RTP), as described, for example, in Request for Comments (RFC) 3550 dated July 2003 by Internet Engineering Task Force (IETF) and any subsequent revisions.

While embodiments of the present disclosure employ various teachings of the aforementioned standards and protocols, the embodiments as described herein are not limited by these protocols. Those skilled in the art will realize that the above recognized advantages and other advantages described herein are merely illustrative and are not meant to be a complete rendering of all of the advantages of the various embodiments.

Referring now to the figures, FIG. 1 illustrates a trunked network 100. The trunked network 100 provides a general depiction of a physical implementation of various embodiments of the present disclosure. Specifically, the illustrative trunked network 100 is designed for implementation of various methods of managing power consumption for pagers on the trunked network 100. As shown in FIG. 1, an RFSS 102 is in communication with a base station 108, as indicated by an arrow 106. The RFSS 102 includes a trunking controller 104, which is described further below. As shown, the base station 108 wirelessly communicates with a plurality of subscribers 110 within a plurality of talkgroups 112.

Devices in the trunked network 100, including the RFSS 102, the subscribers, and infrastructure devices (not shown) in the trunked network 100, generally include a memory, one or more network interfaces, and a processing device or processor that are operatively coupled, and which when programmed form the means for the device to implement its functionality. The network interfaces are used to send information to and receive information from other devices in the network for carrying out a device's intended functionality.

The implementation of the network interfaces in a given device depends on the particular type of network, i.e., wired and/or wireless, to which the device is connected. For example, where the network supports wired communications, the interfaces may comprise a serial port interface (e.g., compliant to the RS-232 standard), a parallel port interface, an Ethernet interface, a USB interface, and/or a FireWire interface, and other well known interfaces. Where the network supports wireless communications, the interfaces comprise elements including processing, modulating, and transceiver elements that are operable in accordance with any one or more standard or proprietary wireless interfaces. Some of the functionality of the processing, modulating, and transceiver elements may be performed by means of the processor of the particular device through programmed logic such as software applications or firmware stored on the memory of the device.

In addition to the above-mentioned functionality, implemented via programmed logic or code, the processor of a given device is further programmed with logic or code for performing signaling and functionality to facilitate methods in accordance with the teachings herein, such as methods described by reference to FIGS. 2 and 3; and/or the processing device may be implemented as a state machine or ASIC. The memory in a device can include short-term and/or long-term storage of various data needed for the functioning of the device and its intended functionality.

Turning now to a description of the various elements shown in FIG. 1, the plurality of talkgroups 112 includes a talkgroup N, a talkgroup N+1, and a talkgroup N+2. The talkgroup N includes a subscriber M and a subscriber M+1. The talkgroup N+1 includes a subscriber P and a subscriber P+1. The talkgroup N+2 includes a subscriber R and a subscriber R+1. In some embodiments, each of the plurality of talkgroups 112 is preconfigured with specified subscribers. Alternatively, members of the plurality of talkgroups 112 can be dynamically determined by a subscriber's affiliation.

In a conventional or "non-trunked" system, subscribers control their channel access by directly selecting a frequency or channel. However, in the trunked network 100, the trunking controller 104 manages system operation. Such system operation in the trunked network 100 includes, for example, granting subscriber access to traffic channels and signaling subscribers over a control channel.

In some embodiments, the control channel includes a dedicated or "primary" control channel. Alternatively, the control channel may comprise a composite control channel, where the composite control channel can act as a traffic channel when no other traffic channels are available. In other embodiments, a secondary control channel is provided. The secondary control channel is used, for example, when the dedicated control channel is not available.

When any of the plurality of subscribers 110 in the trunked network 100 is initially powered on or when a previously powered on subscriber 110 enters a new registration area, as defined by the RFSS 102, the subscriber 110 registers with the RFSS 102. Registration is a process by which the trunked network 100 ensures that only authorized subscribers 110 have access to the trunked network 100. In addition, registration can be used to track a subscriber's location within the trunked network 100.

As described above, subscriber signaling in the trunked network 100 is facilitated by way of a control channel. In particular, the trunking controller 104 signals the subscribers 110 by way of an outbound signaling packet (OSP). Upon powering up, the subscribers 110 scan an available list of control channels to find an active control channel for the trunked system 100. The subscribers 110 receive the active control channel from the OSP, as discussed below. In particular, the subscribers 110 listen on the active control channel for a voice channel assignment. The OSP, as directed by the trunking controller 104, periodically sends out the voice channel assignment to the paging listeners. The voice channel assignment corresponds to one of the plurality of talkgroups 112. In some embodiments, all of the plurality of talkgroups 112 are assigned to the same voice channel. Alternatively, each of the plurality of talkgroups 112 may be assigned to a different voice channel. Also, a subset of the plurality of talkgroups 112 can share a voice channel.

In various embodiments, the OSP providing the voice channel assignment reserves a frequency corresponding to the voice channel assignment. The reserved frequency is referred to as a "low power voice channel", which indicates a voice channel where the subscribers 110 wait for voice traffic in a low power, standby mode. Illustratively, the low power, standby mode includes initiating receiver shutdown procedures at the subscribers 110 to reduce power consumption and extend the trunked pager's battery life.

Upon receiving their voice channel assignments, the subscribers 110 synthesize the assigned voice channel frequency and subsequently move to that channel. While on the assigned voice channel, the subscribers 110 enter the low power, standby mode and wait for voice traffic. As used herein, "wait for voice traffic" or "waiting for voice traffic" refers to the subscribers 110 listening for voice traffic on the assigned voice channel, for instance, by attempting to detect a carrier. "Voice" traffic in this context is not meant to be limited to audio but is any media that has a compatible format for being received and processed by the trunked pager. The trunking controller 104 sends voice traffic to the subscribers 110 on the assigned voice channel. The subscribers 110 detect a carrier that includes the voice traffic, and the subscribers leave the standby mode and return to an active mode of operation or "wake-up" and begin receiving the voice traffic. Optionally, the subscribers 110 can save the voice traffic in a buffer memory device.

The voice traffic sent by the trunking controller 104 to the subscribers 110 identifies an intended recipient by way of a control command. In particular, the voice traffic identifies, by the control command, the intended recipient, from the paging listeners, to unmute to the voice traffic. In some embodiments, the control command includes link control data. Illustratively, the link control data identifies a talkgroup. However, the link control data can identify a subscriber 110. Also, link control data can be appended to a digital voice packet for transmission over a radio channel. Alternatively, the link control data may be interleaved within the digital voice packet for transmission over the radio channel. Illustratively, when the subscribers 110 receive the voice traffic, the subscribers 110 compare their talkgroup ID with the link control data to determine whether the voice traffic is for a communication group that includes any of the subscribers 110.

If the link control data does not match a subscriber's group, the subscribers 110 return to the control channel to listen for a different voice channel assignment. However, if the link control data matches a subscriber's group, the subscribers 110 in the group corresponding to the matching link control data unmute to the voice traffic. In embodiments where the voice traffic is saved in the buffer memory device of the trunked pager, the subscribers 110 unmute from the beginning of the buffer and listen to the voice traffic. The subscribers 110 listen to the voice traffic until the carrier is no longer detected. Alternatively, the subscribers 110 can listen to the voice traffic until the link control data no longer matches the subscriber's group. Optionally, the trunking controller 104 transmits decode tones that are used by the subscribers 110 to unmute to the voice traffic. For example, the subscribers 110 unmute upon detection of a specific sequence of decode tones, and the subscribers 110 are reset manually or automatically. Upon termination of the voice traffic, the subscribers 110 temporarily return to the control channel to listen for a different voice channel assignment.

The subscribers 110 receive the different voice channel assignment from the trunking controller 104 by way of the OSP, which continues to periodically send out the voice channel assignment to the paging listeners. The subscribers 110, on their newly assigned voice channel, enter the low power, standby mode and wait for voice traffic. In some embodiments, as described above, a group of subscribers 110 that did not match the link control data can directly return to the control channel, receive their new voice channel assignment, and enter the standby mode on the newly assigned voice channel while a group of subscribers 110 that did match the link control data are still listening to the voice traffic. Alternatively, the group of subscribers 110 that did not match the link control data returns to the control channel and receives their new voice channel assignment while the group of subscribers 110 that did match the link control data are still listening to the voice traffic. In other embodiments, the group of subscribers 110 that did not match the link control data returns to the control channel and receives their new voice channel assignment while the group of subscribers 110 that did match the link control data are still listening to the voice traffic. Alternatively, the group of subscribers 110 that did not match the link control data can wait until the subscribers 110 that did match the link control data have finished listening to the voice traffic, and all the subscribers return, in a nearly simultaneous manner, to the control channel to receive their new voice channel assignment.

For the various embodiments as herein described, the subscribers 110 spend only a minimal amount of time on the control channel as required to receive a voice channel assignment and dynamically move to the assigned voice channel.

Illustratively, by dwelling on a voice channel in the standby mode when there is no voice traffic, as opposed to remaining on the control channel and continually decoding and discarding extraneous control messages, the power consumption of the trunked pagers is significantly reduced. Thus, battery life is significantly extended.

Figure 2A:
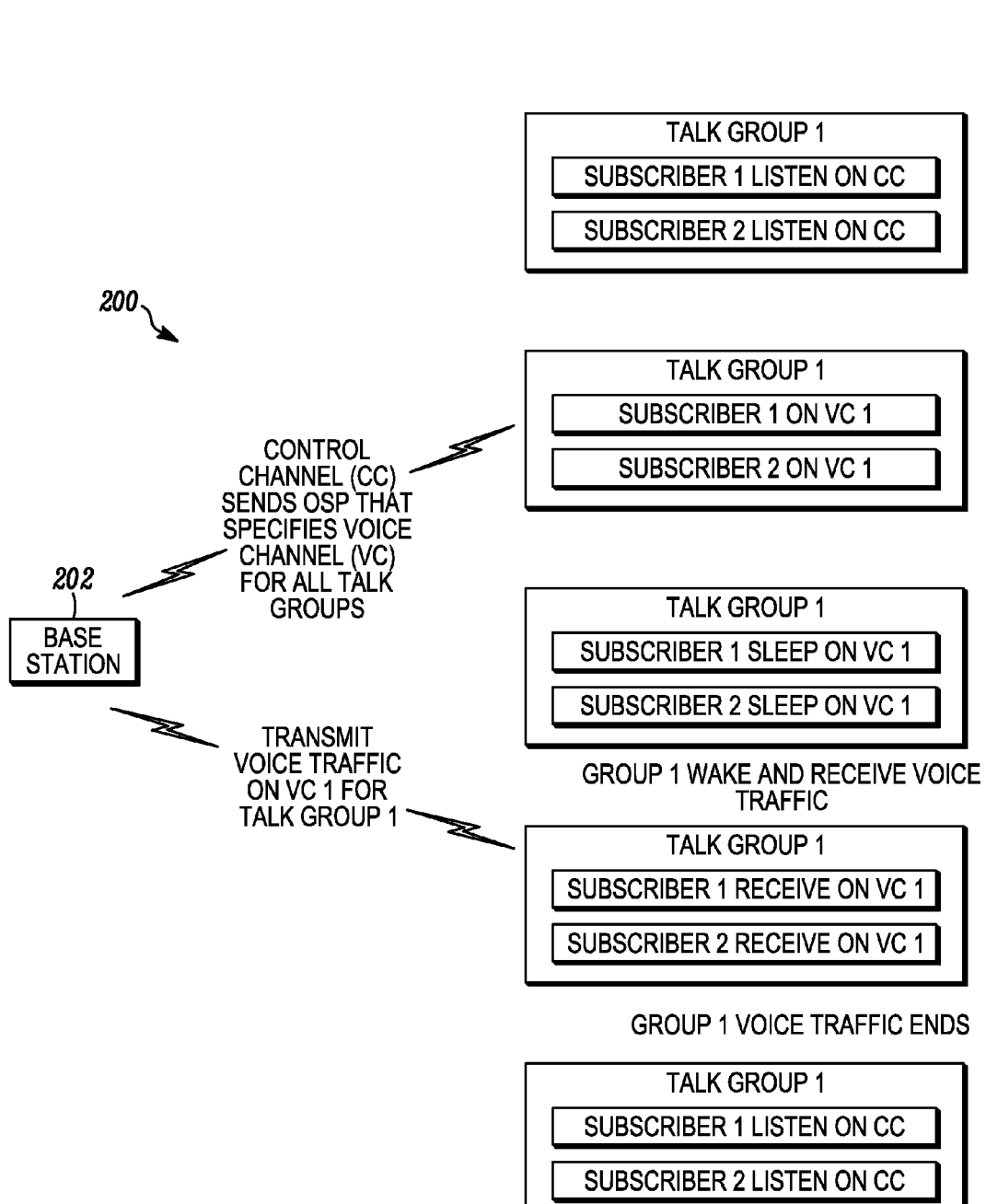
FIG. 2 (FIG. 2A and FIG. 2B) illustrates a method of managing power consumption in a trunked network in accordance with some embodiments.
Figure 2B:
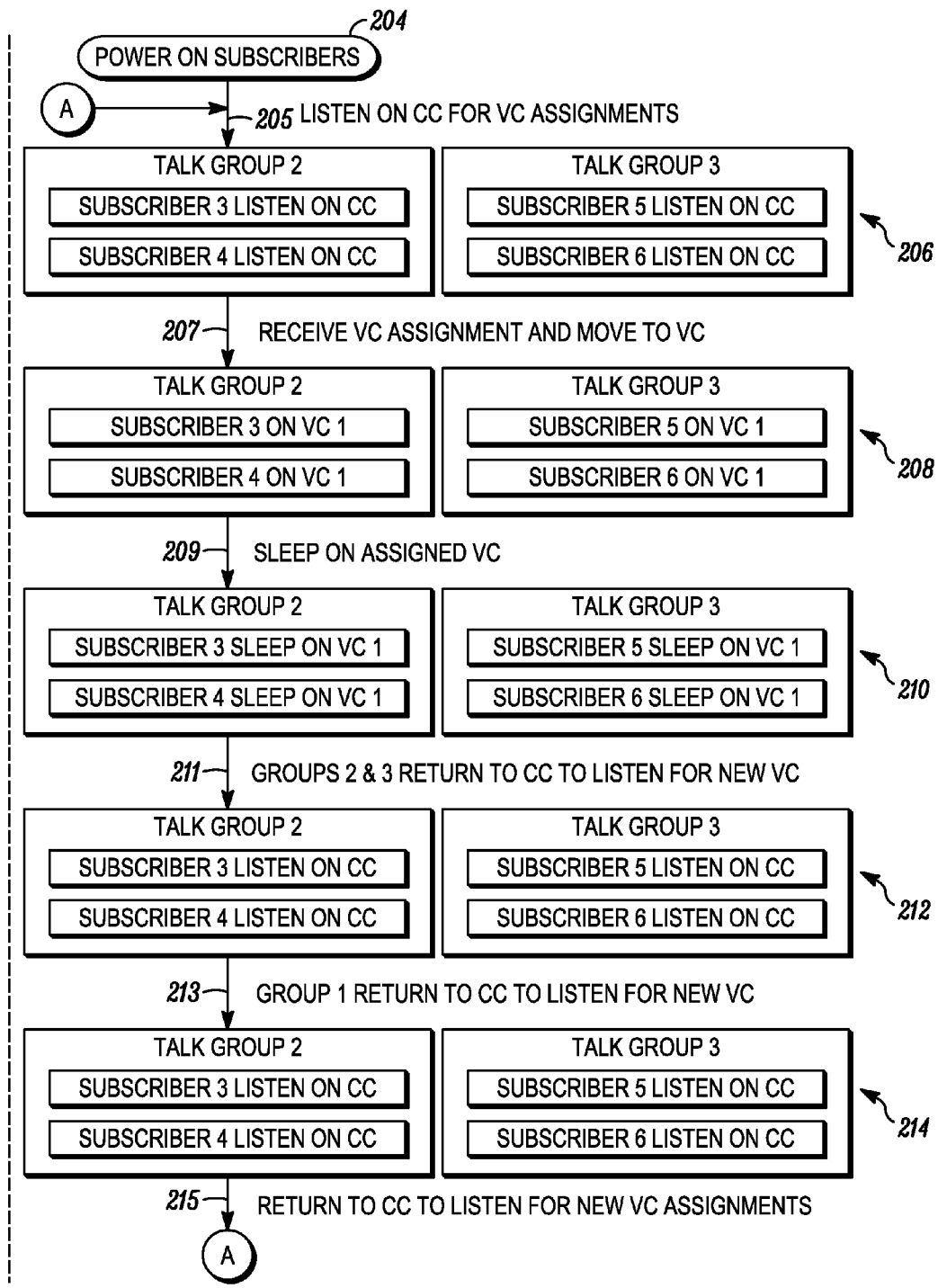

Referring now to FIG. 2, a method 200 of managing power consumption in a trunked network in accordance with some embodiments is illustrated. Specifically, FIG. 2 schematically illustrates one example of the embodiments as discussed with reference to FIG. 1. As depicted, a trunking controller (not shown) is in communication with a talkgroup 1, a talkgroup 2, and a talkgroup 3 through a base station 202. The talkgroup 1 includes a subscriber 1 and a subscriber 2, the talkgroup 2 includes a subscriber 3 and a subscriber 4, and the talkgroup 3 includes a subscriber 5 and a subscriber 6.

The subscribers 1-6 power on, not necessarily simultaneously, (at 204) and listen on a control channel (CC) for a voice channel (VC) assignment (at 206), as indicated by an arrow 205. As indicated by an arrow 207, the subscribers 1-6 receive their assigned voice channel and subsequently move to the assigned voice channel (at 208). The trunking controller sends the OSP over a control channel through the base station 202, where the OSP includes the voice channel assignment to the paging listeners. In this illustrative example, each of the subscribers 1-6 within each of the talkgroups 1-3 is assigned to a voice channel 1. In some embodiments, all subscribers 1-6 are assigned to the same voice channel to conserve resources on the trunked network. However, any of the subscribers 1-6 and talkgroups 1-3 can be assigned to different voice channels.

At 210, the subscribers 1-6 enter a standby mode or "sleep" on their assigned voice channel, as indicated by an arrow 209. Specifically, each of the subscribers 1-6 sleeps on the voice channel 1. A carrier, including voice traffic, is detected as received from the base station 202. The voice traffic is transmitted on the voice channel 1 for talkgroup 1. Thus, all of the subscribers 1-6 detect the voice traffic. However, not all of the subscribers unmute to the voice traffic. Specifically, the voice traffic includes a link control data that identifies the talkgroup 1 as the intended recipient of the voice traffic. As represented by an arrow 211 and at 212, the link control data matches the talkgroup 1, and the subscribers 1-2 unmute to the voice traffic and listen to the voice traffic until the carrier is no longer detected or until the link control data no longer matches the talkgroup 1. As shown at 212, the subscribers 3-6 did not match the link control data and returned to the control channel to listen for a different voice channel assignment. In some embodiments, the subscribers 3-6 that did not match the link control data directly return to the control channel, for example at 212, to receive their new voice channel assignment and enter the standby mode on the newly assigned voice channel while the subscribers 1-2 that did match the link control data are still listening to the voice traffic.

Upon termination of the voice traffic, as indicated by an arrow 213, the talkgroup 1 returns to the control channel to listen for the different voice channel assignment (at 214). As illustrated at 214, the subscribers 3-6 continue to listen on the control channel for a different voice channel assignment. However, the subscribers 3-6 that did not match the link control data can return to the control channel, for example at 214, to receive their new voice channel assignment and enter the standby mode on the newly assigned voice channel while the subscribers 1-2 are still listening on the control channel for the different voice channel assignment. In other embodiments, the subscribers 1-2 also return to the control channel, for example at 214, to receive their new voice channel assignment and enter the standby mode on the newly assigned voice channel.

As indicated by an arrow 215, all of the subscribers 1-6 return to the control channel to listen for the different voice channel assignment. Continuing with the example, the subscribers 1-6 receive their new voice channel assignment and enter the standby mode on the newly assigned voice channel. Thus, the power consumption of the subscribers 1-6 is significantly reduced and their battery life is extended.

Figure 3:
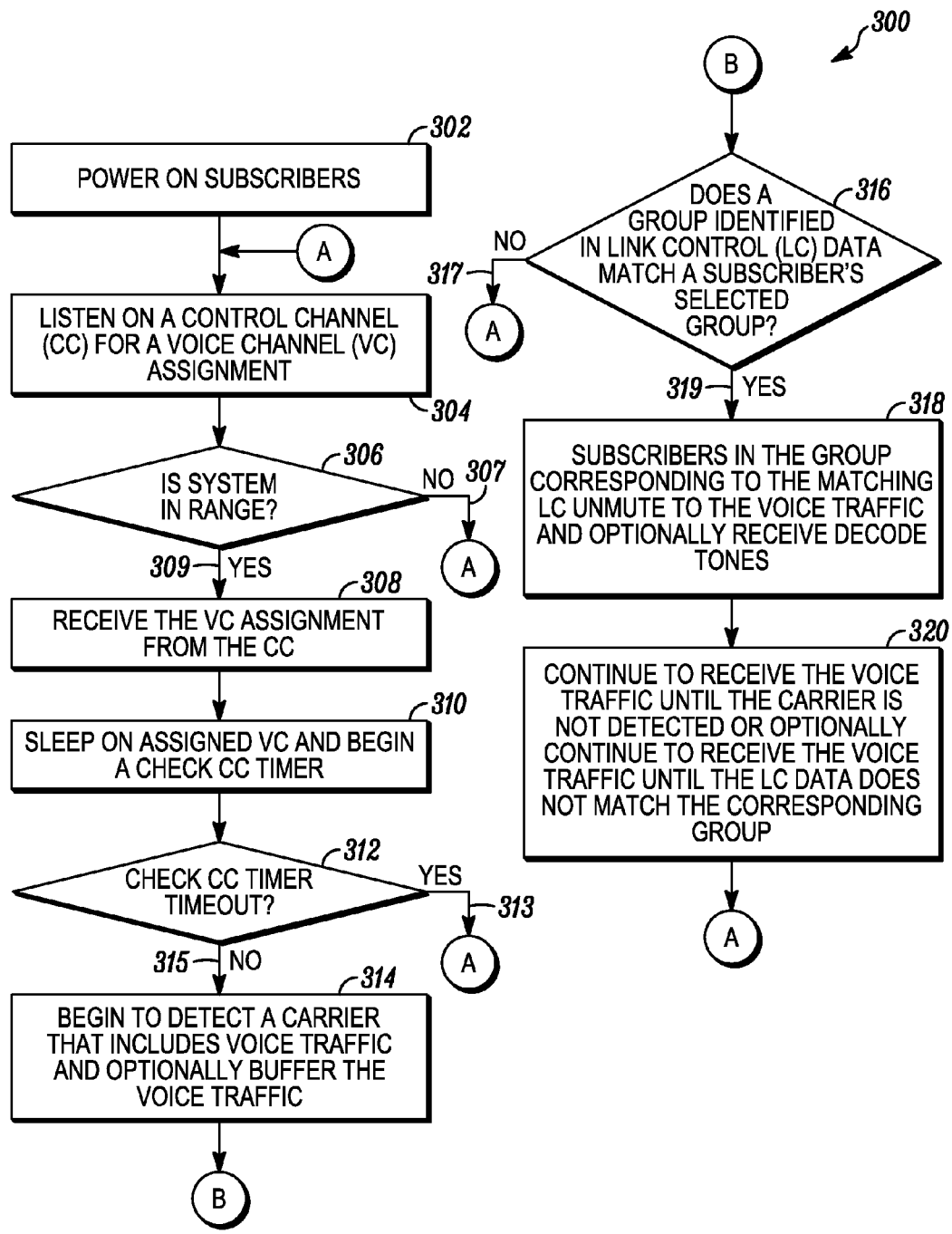
FIG. 3 is a logical flowchart showing an illustrative method for managing power consumption in a trunked network in accordance with some embodiments.

FIG. 3 shows a logical flowchart showing an illustrative method 300 for managing power consumption in a trunked network in accordance with some embodiments. Accordingly, at 302, the subscribers are powered on. The subscribers search for an active control channel of the trunked network and, upon finding the control channel, listen on the control channel for a voice channel assignment (at 304). The subscribers also detect whether the trunked network or trunked system is in range (at 306). For example, in some embodiments, after initially finding the control channel, the subscribers move out of range of the trunked network. If the subscribers move out of range, as indicated by an arrow 307 and by a connector A, the subscribers return to search for the active control channel of the trunked network and, upon finding the control channel, listen on the control channel for the voice channel assignment (at 304).

If the subscribers remain in range of the trunked network, as indicated by an arrow 309, the subscribers receive a voice channel assignment from an OSP transmitted by a trunking controller of the trunked network (at 308). At 310, while on the assigned voice channel, the subscribers enter the low power, standby mode and wait for voice traffic. Additionally, a control channel timer is started. Illustratively, if the control timer reaches a predetermined threshold value, a control channel timeout is detected. Accordingly, at 312, the control channel timer is checked for the timeout condition. If the control channel timeout is detected (at 312), as indicated by an arrow 313 and by the connector A, the subscribers return to search for the active control channel of the trunked network and, upon finding the control channel, listen on the control channel for the voice channel assignment (at 304).

If the control channel timer is not detected (at 312), as indicated by an arrow 315, the subscribers begin to detect a carrier that includes the voice traffic (at 314). Upon detecting the voice traffic, the subscribers return to an active mode of operation. In some embodiments, the subscribers save the voice traffic in a subscriber buffer memory device, which for example is the buffer memory device of the trunked pager. As indicated by a connector B, the subscribers compare their talkgroup ID with the link control data sent within the voice traffic to determine whether a group identified by the link control data matches a subscriber's group (at 316). If the link control data does not match a subscriber's group (at 316), as indicated by an arrow 317 and by the connector A, the subscribers return to search for the active control channel of the trunked network and, upon finding the control channel, listen on the control channel for the voice channel assignment (at 304).

If the link control data does match a subscriber's group (at 316), as indicated by an arrow 319, the subscribers in the group corresponding to the matching link control data unmute to the voice traffic (at 318). Optionally, the subscribers receive decode tones from the trunking controller that are used by the subscribers to unmute to the voice traffic if a particular sequence of decode tones is detected. In some embodiments, subscribers that are members of groups that did not match the link control data can directly return to the control channel, receive their new voice channel assignment, and enter the standby mode on the newly assigned voice channel while the subscribers in the group corresponding to the matching link control data continue to unmute to the voice traffic.

At 320, the subscribers in the group corresponding to the matching link control data unmute to the voice traffic until the carrier is no longer detected. In other embodiments, the subscribers in the group corresponding to the matching link control data unmute to the voice traffic until the link control data no longer matches a subscriber's group. As indicated by the connector A, the voice traffic ends and the subscribers return to search for the active control channel of the trunked network and, upon finding the control channel, listen on the control channel for the voice channel assignment (at 304).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for managing power consumption in a trunked pager, the method comprising:
 at the trunked pager:
 listening to a control channel on a trunked system and receiving an assignment for a voice channel for paging listeners;
 implementing a standby mode that comprises a receiver shutdown procedures at the trunked pager to consume less power;
 listening for voice traffic on the assigned voice channel while in a standby mode;
 upon detecting the voice traffic leaving the standby mode and, determining whether the voice traffic is for a communication group that includes the trunked pager;
 when the voice traffic is for a communication group that includes the trunked pager, listening to the voice traffic, and upon termination of the voice traffic, returning to listening to the control channel for an assignment of a different voice channel for the paging listeners; and
 when the voice traffic is for a communication group of which the trunked pager is not a member, returning to listening to the control channel for the assignment of the different voice channel for the paging listeners.

2. The method of claim 1 further comprising:
listening for voice traffic on the different voice channel while in the standby mode.

3. The method of claim 1 further including:
synthesizing a voice channel frequency that corresponds to the assigned voice channel.

4. The method of claim 1, wherein the voice channel assignment is periodically sent to the trunked pager while on the control channel.

5. The method of claim 1, wherein the assigned voice channel includes a low power voice channel.

6. The method of claim 1 further comprising:
upon detecting the voice traffic, returning the trunked pager to an active mode of operation.

7. The method of claim 1 further comprising:
upon detecting the voice traffic, saving the voice traffic in a buffer memory device of the trunked pager.

8. The method of claim 1 further comprising:
receiving a control command while on the assigned voice channel.

9. The method of claim 8, wherein the control command includes link control data for identifying the communication group for the paging listeners to unmute to the voice traffic.

10. The method of claim 9 further comprising:
matching the link control data to the communication group that includes the trunked pager; and
unmuting the trunked pager to the voice traffic.

11. The method of claim 1 further comprising:
monitoring a control channel timer for a timeout condition; and
upon detection of the timeout condition, returning to listening to the control channel for the assignment of the different voice channel for the paging listeners.

12. The method of claim 1 further comprising:
receiving decode tones while on the assigned voice channel.

* * * * *